(12) United States Patent
Dowell et al.

(10) Patent No.: US 9,702,984 B1
(45) Date of Patent: Jul. 11, 2017

(54) LONG-DISTANCE TRANSMISSION OF LIGHT IN A SCINTILLATOR-BASED RADIATION DETECTOR

(71) Applicant: Los Alamos National Security, LLC, Los Alamos, NM (US)

(72) Inventors: L. Jonathan Dowell, Los Alamos, NM (US); Dale V. Talbott, Rio Rancho, NM (US); Markus P. Hehlen, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 0 days.

(21) Appl. No.: 15/171,973

(22) Filed: Jun. 2, 2016

Related U.S. Application Data

(60) Provisional application No. 62/170,448, filed on Jun. 3, 2015.

(51) Int. Cl.
*G01T 1/20* (2006.01)

(52) U.S. Cl.
CPC .................... *G01T 1/2006* (2013.01)

(58) Field of Classification Search
CPC .................................................. G01T 1/2006
See application file for complete search history.

(56) References Cited

U.S. PATENT DOCUMENTS

| 6,310,352 B1 * | 10/2001 | Gross | G01J 1/48 |
| | | | 250/370.11 |
| 2015/0323683 A1 * | 11/2015 | Vasilyev | G01V 5/107 |
| | | | 250/269.1 |

OTHER PUBLICATIONS

Saint-Gobain Crystals, "Scintillation Products," Scintillation Materials and Assemblies, https://www.saint-gobain.co.jp/sites/default/files/download/pdf/Crystal_SGC_Scintillation_Materials_and_Assemblies_Saint-Gobain.pdf, 12 pages (accessed May 27, 2016).
Saint-Gobain, "Detectors," http://www.oilandgas.saint-gobain.com/scintillation-detectors.aspx, 2 pages (accessed Jun. 1, 2016).
Wikipedia, "Well logging," https://en.wikipedia.org/wiki/Well_logging, 11 pages (accessed May 27, 2016).
Park et al., "Evaluation of the Detection Efficiency of LYSO Scintillator in the Fiber-Optic Radiation Sensor," *Science and Technology of Nuclear Installations*, vol. 2014, Article 248403, 7 pages, Apr. 6, 2014.

(Continued)

*Primary Examiner* — Mark R Gaworecki
(74) *Attorney, Agent, or Firm* — Klarquist Sparkman, LLP

(57) ABSTRACT

Scintillator-based radiation detectors capable of transmitting light indicating the presence of radiation for long distances are disclosed herein. A radiation detector can include a scintillator layer and a light-guide layer. The scintillator layer is configured to produce light upon receiving incident radiation. The light-guide layer is configured to receive light produced by the scintillator layer and either propagate the received light through the radiation detector or absorb the received light and emit light, through fluorescence, that is propagated through the radiation detector. A radiation detector can also include an outer layer partially surrounding the scintillator layer and light-guide layer. The index of refraction of the light-guide layer can be greater than the index of refraction of adjacent layers.

20 Claims, 11 Drawing Sheets

(56) References Cited

OTHER PUBLICATIONS

Takada et al., "Distributed Sensing of Fusion Neutrons by Plastic Scintillating Fibers", *Fusion Engineering and Design*, 34-35, pp. 591-594, 1997.

Kawarabayashi et al., "Distributed Radiation Sensor with Flexible Light Guide Filled with Liquid Organic Scintillator," *2006 IEEE Nuclear Science Symposium Conference Record*, N30-140, 2 pages, Nov. 17, 2006.

Weiss, "Trapping Efficiency of Fluorescent Optical Fibers," *Optical Engineering* 54(2), 027101, 6 pages, Feb. 2015 (accessed May 27, 2016).

\* cited by examiner $n_2 > n_1, n_3$

LONG-DISTANCE TRANSMISSION OF LIGHT IN A SCINTILLATOR-BASED RADIATION DETECTOR

CROSS-REFERENCE TO RELATED APPLICATIONS

This application claims the benefit of U.S. Provisional Application No. 62/170,448, filed on Jun. 3, 2015 and titled "LONG-DISTANCE TRANSMISSION OF LIGHT IN A SCINTILLATOR-BASED RADIATION DETECTOR," which is incorporated herein by reference in its entirety.

ACKNOWLEDGMENT OF GOVERNMENT SUPPORT

This invention was made with government support under Contract No. DE-AC52-06NA25396 awarded by the U.S. Department of Energy. The government has certain rights in the invention.

FIELD

This disclosure relates generally to the field of detection and security, and more particularly to the sensing, detection, and monitoring of natural and artificial sources of radiation.

BACKGROUND

Radiation can be detected through a variety of approaches, including the use of scintillators. Scintillators are materials that emit light upon receiving incident radiation. The detection of light produced by a scintillator is thus an indication that radiation has been detected. Conventional radiation detectors that use a scintillator transmit the light emitted by the scintillator through the scintillating material itself to a photodetector. Emitted light, however, is typically severely attenuated as it propagates through the scintillator, limiting the amount of scintillating material that can be used between the photodetector and the point of scintillation (and thus limiting the length of the scintillator that can be used).

SUMMARY

Examples described herein relate to scintillator-based radiation detectors. A radiation detector can include a scintillator layer. The scintillator layer is configured to produce light upon receiving incident radiation. The radiation detector can also include a light-guide layer optically coupled to the scintillator layer. The light-guide layer is configured to propagate light associated with radiation detection in the scintillator layer. The light-guide layer can be a fluorescent light-guide layer that emits light by fluorescence in response to light emitted by the scintillator layer and propagates the light within the light-guide layer.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The foregoing and other objects, features, and advantages of the claimed subject matter will become more apparent from the following detailed description, which proceeds with reference to the accompanying figures.

DETAILED DESCRIPTION

Figure 1:
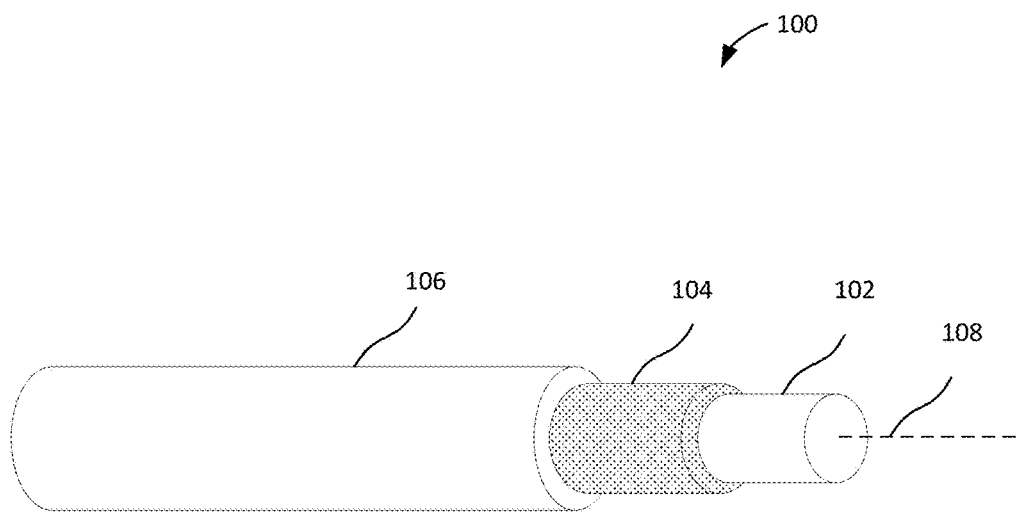
FIG. 1 is a partial perspective view of an example scintillator-based radiation detector.

Scintillator-based radiation detectors can be made by optically coupling a scintillator layer and a light-guide layer. The light-guide layer is configured to propagate light associated with radiation detection in the scintillator layer. As used herein, "optically coupled" includes both a direct coupling in which layers are in contact with each other as well as coupling in which one or more additional layers (or air gaps) separate the scintillator layer and light-guide layer but allow light to travel from the scintillator layer to the light-guide layer through the additional layers. The light is propagated by the mechanism of internal reflection (e.g., total internal reflection or partial internal reflection). The propagated light can be the light emitted by the scintillator layer, or in examples in which a fluorescent light-guide layer is used, the propagated light can be light emitted by fluorescence in the light-guide layer in response to receiving light emitted by the scintillator. In contrast to conventional radiation detectors in which light typically attenuates to undetectable levels after propagating through a scintillator after only a few meters, the example radiation detectors described herein are capable of transmitting light indicating a radiation detection up to and beyond, for example, tens of thousands of meters, enabling photodetectors and detection electronics to be placed long distances from areas of radiation.

The scintillator can be configured to produce light upon receiving at least one of alpha particles, beta particles, gamma rays, neutrons, ions, x-rays, or other ionizing radiation. The scintillator can comprise at least one of a crystalline solid, an amorphous solid, or a liquid. The scintillator can also be a composite scintillator in which scintillator particles are dispersed in a polymer matrix. Example scintillators can include $Tl^+$-doped sodium iodide, garnet crystals, $Ce^{3+}$-doped lanthanum bromide, $Ce^{3+}$-doped yttrium orthosilicate, $Eu^{2+}$-doped strontium iodide, lithium-containing materials, or ytterbium-containing materials. Some scintillators, such as CLYC ($Cs_2LiYCl_6$:Ce) crystals, emit light of different pulse shapes based on the type of received radiation and thus can be used to sense and distinguish gamma radiation and neutrons using pulse shape discrimination (PSD). Additionally, different levels of gamma radiation can be distinguished between using scintillators having different output pulse heights. The index of refraction of the scintillator can be, for example, between 1.1 and 2.5. Other indices of refraction are also contemplated. The scintillator can be configured to emit light in response to incident gamma rays having, for example, energies between approximately 10 keV and 5 MeV.

The light-guide layer is made at least partially of a material that propagates light without significant attenuation. Example materials include but are not limited to optical plastic, glass, quartz or fused silica. Such materials can propagate light over long distances (e.g. ranging from a few meters to thousands of meters or more). Examples of "optical plastic" include materials such as acrylic (e.g., polymethyl methacrylate (PMMA)), perfluorinated polymers, microstructured polymer optical fibers (mPOF), and other materials typically used in optical fibers. In some examples, the light-guide layer comprises fibers of optical plastic, glass, or quartz. The fibers can be surrounded with a gel (which is also in contact with the scintillator) or other substance having an index of refraction similar to the scintillator such that light produced by the scintillator can travel into the material surrounding the scintillator (including the gel) and then into the fibers, where the light is internally reflected and propagated. The light-guide layer can be configured to propagate at least a certain percentage (e.g., 1%, 5%, 10%, 20%, etc.) of a total amount of light emitted by the scintillator layer or produced through fluorescence to a photodetector.

Internal reflection within the light-guide layer is a function of the angle of incidence of the light as well as the index of refraction of the light-guide layer relative to the index of refraction of the materials with which the light-guide layer is in contact. For example, if the index of refraction of the light-guide layer is higher than the index of refraction of the scintillator layer, light generated by a scintillator in the scintillator layer can pass into the light-guide layer. Once in the light-guide layer, however, much or most of the light can be internally reflected at the boundary between the light-guide layer and the scintillator layer and propagated within the light-guide layer rather than re-entering the scintillator layer. In some examples, air surrounds the light-guide layer and can be thought of as an outer layer. The index of refraction of air is typically lower than the index of refraction of the light-guide layer, and the higher index of refraction of the light-guide layer relative to air also results in internal reflection of the light within the light-guide layer at the boundary between the light-guide layer and air rather than transmission of the light into the air.

In some examples, the index of refraction of the scintillator layer and the light-guide layer are substantially similar or equal. In such situations, less light will be internally reflected at the boundary than if the index of refraction of the light-guide layer were higher than the index of refraction of the scintillator layer (or higher by a greater amount), but at least some light will propagate through the light-guide layer and can be detected by a photodetector a longer distance away than would be possible through conventional approaches.

The described scintillator-based radiation detectors can also include an outer layer at least partially surrounding the light-guide layer and the scintillator layer. The outer layer can be a material having an index of refraction such that light is internally reflected in the light-guide layer at the boundary of the light-guide layer and the outer layer (for examples in which the light-guide layer partially surrounds the scintillator layer). For example, the outer layer can have a lower index of refraction than the light-guide layer. The outer layer can comprise, for example, a cladding material typically used in fiber optic cables. Examples of scintillator-based radiation detectors having an outer layer are shown in FIGS. 1-2 and 7-10.

FIG. 1 illustrates a radiation detector 100 having an inner layer (also referred to as a scintillator layer) 102. Light-guide layer 104 surrounds inner layer 102, and an outer layer 106 surrounds light-guide layer 104. The index of refraction of inner layer 102 and the index of refraction of outer layer 106 can be lower than the index of refraction of light-guide layer 104 such that the light emitted by inner layer 102 and transmitted into light-guide layer 104 is propagated through radiation detector 100. In some examples, outer layer 106 is omitted. In some examples, inner layer 102 is the light-guide layer and layer 104 is the scintillator layer.

FIG. 1 illustrates radiation detector 100 in an elongate and cylindrical shape (e.g., a rigid cylinder or a flexible cable such as an optical fiber cable) having a circular cross section. Inner layer 102 is shown as a solid cylinder, and light-guide layer 104 and outer layer 106 are shown as hollow cylinders partially surrounding inner layer 102. In some examples, there are no gaps between layers, in other examples, gaps can act as additional layers. Inner layer 102, light-guide layer 104, and outer layer 106 are coaxial about an axis 108 extending through the center of inner layer 102. Other geometries are also possible. For example, one or more of inner layer 102, light-guide layer 104, or outer layer 106 can have a cross section in the shape of a triangle, square, rectangle, pentagon, oval, other polygon, or other shape. In some examples, the respective layers are not coaxial.

Additional layers (not shown) can also be present and can include durable outer coatings such as rubber, plastic, or other material. In some examples, outer layer 106 can be or comprise such durable outer coatings. In some examples, inner layer 102 comprises a liquid scintillator. In such examples, a cap or other device can be affixed to the ends of radiation detector 106 to contain the liquid scintillator. In FIG. 1, inner layer 102 is depicted as extending farther than light-guide layer 104, which is depicted as extending farther than outer layer 106. The relative lengths of inner layer 102, light-guide layer 104, and outer layer 106 can vary. For example, each of the layers can be a same length.

In some examples, inner layer 102 comprises scintillating materials placed at periodic or other intervals, such as every, for example, three inches, six inches, one foot, ten feet, etc., with non-scintillating material between. In other examples, inner layer 102 comprises scintillating material for a portion of radiation detector 100 and non-scintillating material for the remainder of detector 100. For example, a radiation detector that is a 1000 meter cable can have 100 meters of scintillating material in the inner layer, and for the remaining 900 meters, the inner layer can be non-scintillating material. The non-scintillating material can have an index of refraction such that internal reflection substantially contains the propagating light to the light-guide layer. Such approaches can reduce cost or manufacturing complexity.

Figure 2:
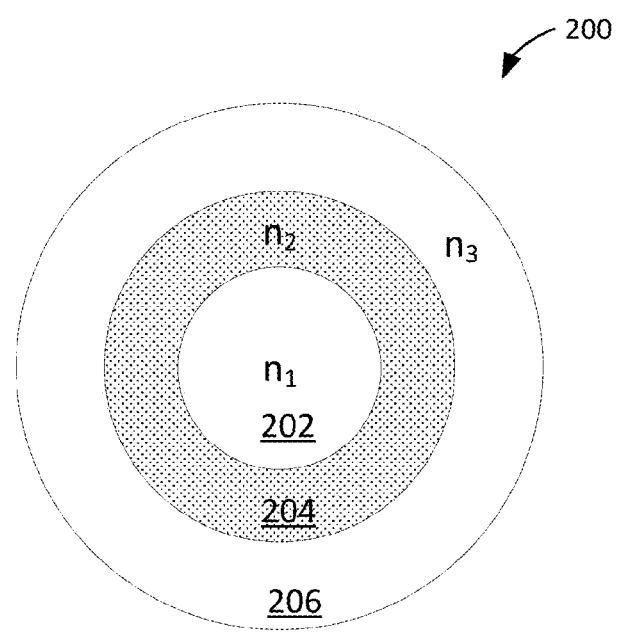
FIG. 2 is a simplified cross-sectional view of an example scintillator-based radiation detector having a scintillator layer, a light-guide layer, and an outer layer.

FIG. 2 illustrates a cross-sectional view of a radiation detector 200 similar to radiation detector 100. Inner layer 202, light-guide layer 204, and outer layer 206 each have a circular cross section. In some examples, the index of refraction $n_2$ of light-guide layer 204 is greater than the indices of refraction $n_1$ and $n_3$ of inner layer 202 and outer layer 206, respectively. The diameter of inner layer 202 can be selected to provide sufficient depth to allow interaction of a target radiation type with the scintillating material in inner layer 202. For a gamma ray detector, for example, the diameter of inner layer 202 can be greater than half a millimeter (e.g., one millimeter, two millimeters, ten millimeters, etc.). The thickness (outer radius minus inner radius) of light-guide layer 204 can be thinner than inner layer 202. Outer layer 206 can also have a thickness less than the diameter of inner layer 202.

The diameter (or for other geometries, width or height) of cross section 200 can be less than one one-hundredth of a length of the light-guide layer. Radiation detector 200 can be a flexible cable of, for example, 5, 10, 20, 100, 1000, 10,000, 100,000 or more meters in length (similar in outward appearance to conventional fiber optic cables). Radiation detector 200 can also be an elongate rigid structure such as a rod.

The described scintillator-based radiation detectors can take various forms. For example, a radiation detector can be a flexible cable as discussed above. A flexible cable can, for example, be extended down a borehole, pipe, chasm, or other narrow structure, artificial or natural, to great depths. The cable can run from the inside of the borehole to a photodetector hundreds or thousands of meters away (as measured by the length of the cable). The length of scintillating material in the inner layer can vary, as discussed above. In examples where the scintillating material in the inner layer extends the length of the cable, then light detected at a photodetector connected to the cable indicates that incident radiation was detected at some point along the length of the cable. In some examples, a limited amount of scintillating material is used in order to more precisely target the location of the incident radiation.

In some examples, multiple radiation-detecting cables can be used to resolve the location of incident radiation with finer granularity. For example, multiple cables could be lowered down a borehole, with a first cable extending to 1000 meters below the surface and with scintillating material in the inner layer for the last 100 meters, the second cable extending to 900 meters below the surface and with scintillating material in the inner layer for the last 100 meters, etc., such that if light is detected for a particular cable, the 100 meter range in which the incident radiation was received can be determined. Additionally or alternatively, shielding (e.g., lead or tungsten for gamma rays) can be employed in some locations along a cable to limit the possible locations along the cable where incident radiation was received.

A radiation-detecting cable can also be wrapped or coiled around an object to provide detection coverage over a larger solid angle (and/or provide a greater thickness of scintillator). For example, a container of suspected radioactive material could be wrapped substantially or completely (similar to wrapping fishing line around a reel or winding a ball of twine), even in multiple layers, with portions of a radiation-detecting cable in which the inner layer contains scintillating material. Using conventional approaches, the light propagating through the scintillator would attenuate in the coils and not reach a photodetector at detectable levels.

Radiation-detector cables can also be formed into a curtain or sheet (e.g., parallel cables placed next to each other or embedded next to each other in a fabric or other structure) or woven together or overlaid to form a mesh or grid.

Radiation-detector cables can also be used to detect radiation over large areas. For example, a radiation-detector cable can be wrapped around (one or multiple times) a nuclear reactor core or other large structure.

In the described examples, the radiation detector is connected to a photodetector, which can be, for example, a photomultiplier, a photodiode, an avalanche photodiode, a cascaded microchannel plate, or other optical sensor. The photodetector receives light (including light pulses) from the light-guide layer and creates electrical signals such as current or voltage (including current or voltage pulses). In some examples, a pulse detector is configured to detect electrical output pulses produced by the photodetector and communicates the pulses to a computing device.

In some examples, an inner layer comprising a scintillator is at least partially surrounded by a layer of air as a light-guide layer, and the light-guide layer is at least partially surrounded by a reflective metal surface (e.g. a metal tube). Various other examples described herein can also be surrounded by a reflective metal surface.

Figure 3:
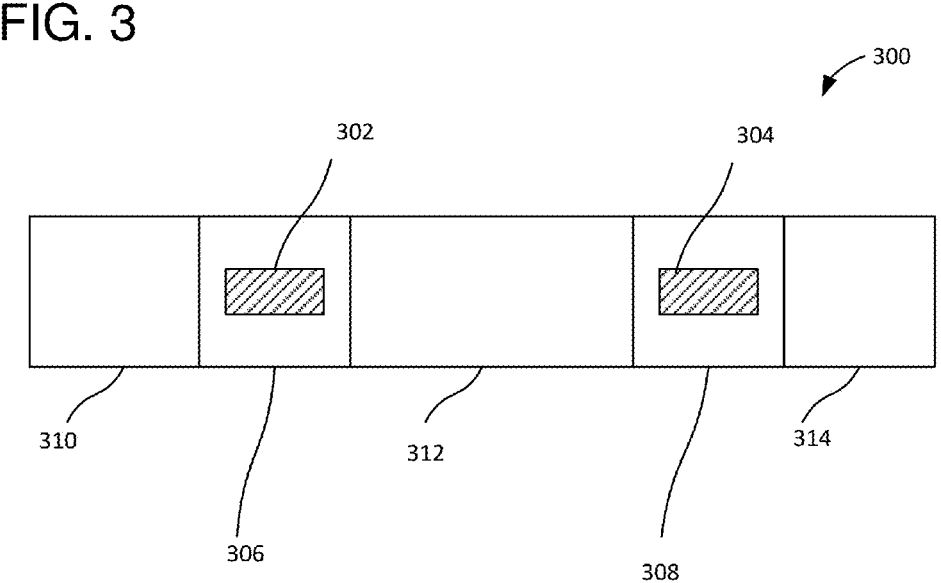
FIG. 3 is a simplified cross-sectional view of an example scintillator-based radiation detector having scintillator segments embedded in light-guide material.
Figure 4:
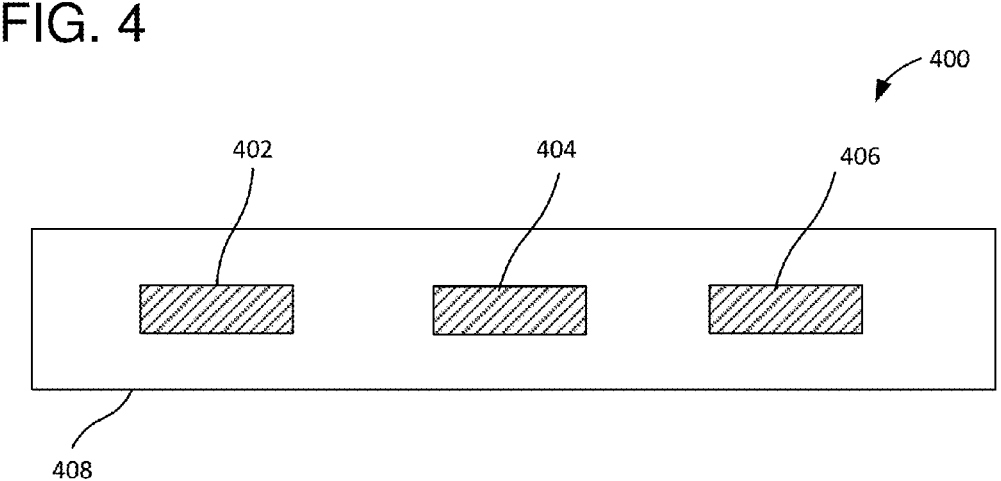
FIG. 4 is a simplified cross-sectional view of an example scintillator-based radiation detector having scintillator segments embedded in the light-guide layer.
Figure 5:
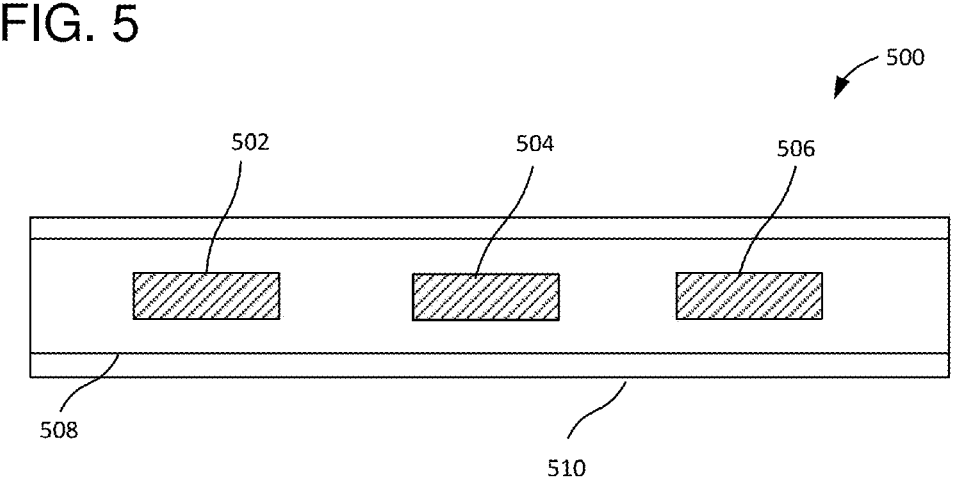
FIG. 5 is a simplified cross-sectional view of an example scintillator-based radiation detector similar to FIG. 4 in which an outer layer is also present.

FIGS. 3-5 illustrate additional examples of scintillator-based radiation detectors. FIG. 3 shows a cross section 300 of a portion of an elongate radiation detector (e.g., a cable). Cross section 300 can continue to either/both the left or right side; a segment is shown here for simplicity. In FIG. 3, scintillator sections 302 and 304 are surrounded by light-guide material portions 306 and 308, respectively, and the light-guide material portions/scintillator sections can be joined to light-guide layer portions 310, 312, and 314. Light-guide material portions 306 and 308 can be the same as the light-guide layer portions 310, 312, and 314 and/or can have a similar index of refraction.

FIG. 4 illustrates a cross section 400 of a scintillator-based radiation detector in which scintillator portions 402, 404, and 406 are embedded within a light-guide layer 408. FIG. 5 illustrates a cross section 500 of a scintillator-based radiation detector in which scintillator portions 502, 504, and 506 are embedded within a light-guide layer 508 and an outer layer 510 is present. Scintillator portions 502, 504, and 506 are spaced within light-guide layer 508 and allow light to be transmitted from scintillator portions 502, 504, and 506 to light-guide layer 508 at different angles, providing additional/different internal reflection characteristics.

Figure 6:
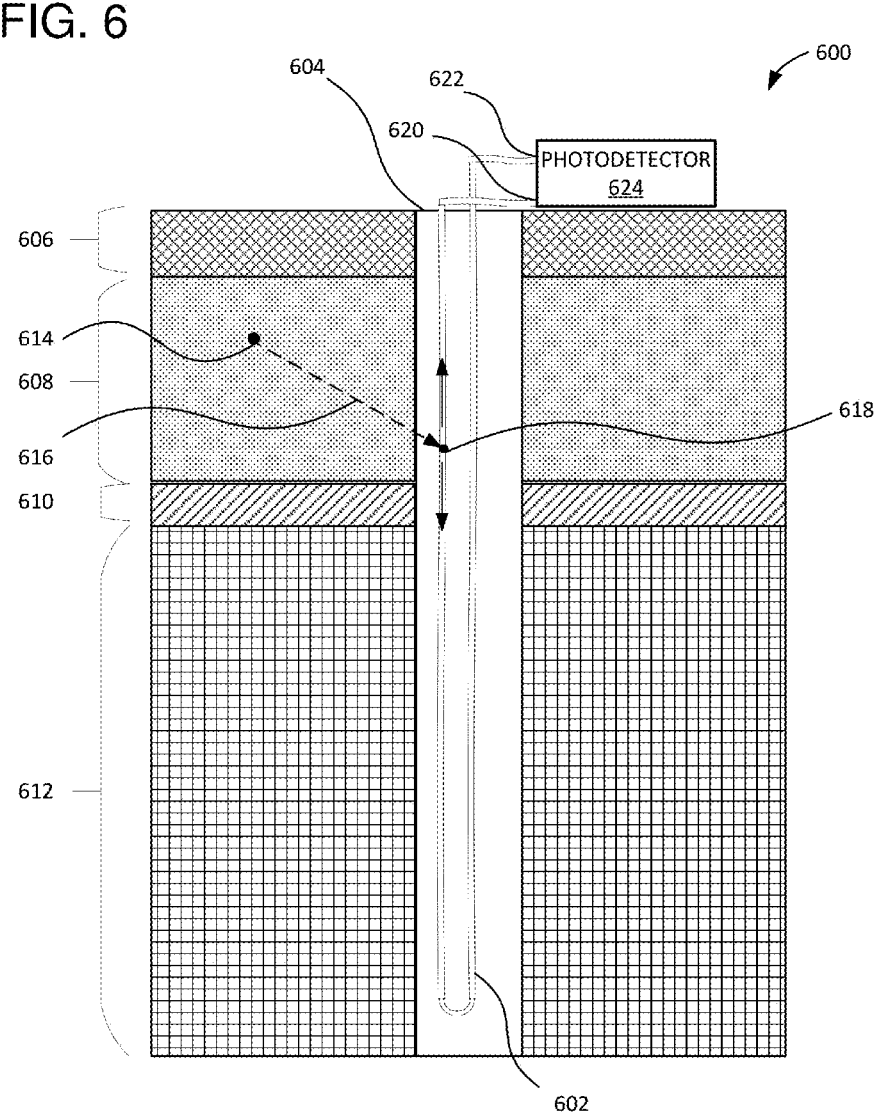
FIG. 6 is a simplified cross-sectional view of an example radiation detection system in which a scintillator-based radiation detector extends down a cavity.

FIG. 6 illustrates a radiation detection system 600. A radiation detector 602 extends down a shaft 604. Shaft 604 extends through rock strata 606, 608, 610, and 612. Shaft 604 can be, for example, a bore shaft, mine shaft, natural chasm or tunnel, or other formation, either natural or artificial. FIG. 6 illustrates a partial, cross-sectional view of shaft 604 and rock strata 606, 608, 610, and 612. Radiation detector 602 can be, for example, a radiation-detector cable having a scintillator and a light-guide layer as is discussed above with respect to FIGS. 1 and 2 or as discussed infra with respect to FIGS. 7-11. Radiation produced by radiation source 614 within rock strata 608 propagates along path 616 and reaches radiation detector 602 at point 618. The radiation can be, for example, gamma rays, and can be generated naturally by the material of rock strata 608, or can be the result of radioactive material buried, stored, injected, etc. in rock strata 608. In some examples, the radiation that reaches point 618 is produced elsewhere and travels through strata 614.

When radiation reaches point 618, the scintillator within radiation detector 602 is excited and emits light that then enters the light-guide layer of radiation detector 602. The light propagates in both directions to reach inputs 620 and 622 of photodetector 624 (or, for examples in which a fluorescent light-guide layer is used, light produced through fluorescence in the light-guide layer in response to receiving light emitted by the scintillator layer propagates in both directions). In some examples, the radiation received at point 618 causes the scintillator to emit a pulse of light. This can be, for example, because of a size of radiation detector 602 and/or an amount of source radiation. In one specific example, the scintillator is approximately between one half inch and two inches in diameter and a number of radioactive particles reaching the scintillator is sufficiently low (low-flux environments) that an individual particle or group of particles can be detected by photodetector 624 without interference from subsequent scintillations.

Photodetector 624 senses the arrival of light pulses that arrive at input 620 (the shorter distance) and at input 622 (the longer distance). Because the speed of light in a particular material is known and the length of radiation detector 602 is known, the difference in the arrival time of the pulses can be used to locate point 618 along radiation detector 602. Although FIG. 6 illustrates a vertical shaft 604, a similar system can be used to detect radiation in horizontal or diagonal pipes, shafts, or other spaces. In some examples, near-simultaneous pulses of light arriving at input 620 and 622 can be distinguished based on pulse intensity, pulse magnitude, or pulse shape.

Figure 7:
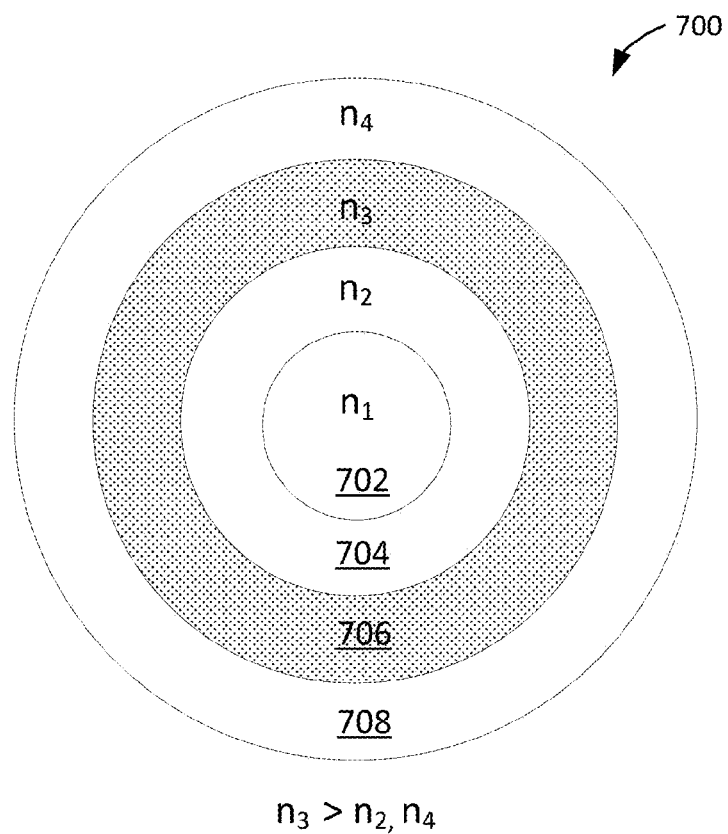
FIG. 7 is a simplified cross-sectional view of an example scintillator-based radiation detector having a scintillator layer, an inner cladding layer, a fluorescent light-guide layer, and an outer cladding layer.

FIG. 7 illustrates a cross-sectional view of a radiation detector 700. Radiation detector 700 can be, for example, a cable or other elongate shape. A scintillator layer 702, an inner cladding layer 704, a light-guide layer 706, and an outer cladding layer 708 each have a circular cross section. In some examples, the index of refraction $n_3$ of light-guide layer 706 is greater than the indices of refraction $n_2$ and $n_4$ of inner cladding layer 704 and outer cladding layer 708, respectively. The diameter of scintillator layer 702 can be selected to provide sufficient depth to allow interaction of a target radiation type with the scintillator material in scintillator layer 702. For a gamma ray detector, for example, the diameter of scintillator layer 702 can be greater than half a millimeter (e.g., one millimeter, two millimeters, ten millimeters, etc.). The thickness (outer radius minus inner radius) of light-guide layer 706 can be thinner than scintillator layer 702. Inner cladding layer 704 and outer cladding layer 708 can also have a thickness less than the diameter of scintillator layer 702. In some examples inner cladding layer 704 and/or outer cladding layer 708 are omitted.

In some examples, light produced by scintillator layer 702 is transmitted through inner cladding layer 704 and into light-guide layer 706. At least some of the light that reaches light-guide layer 706 propagates through light-guide layer 706 through internal reflection, although some light is lost back into inner cladding layer 704.

In other examples, light-guide layer 706 is a fluorescent light-guide layer that absorbs light produced by scintillator layer 702 and emits light through fluorescence within light-guide layer 706. At least some of the light emitted through fluorescence in light-guide layer 706 propagates through light-guide layer 706 through internal reflection (e.g., total internal reflection).

In some examples, light-guide layer 706 and scintillator layer 702 are reversed such that layer 702 (also referred to as the core in a cable example) is the light-guide layer. In such examples, layer 702 can be either a light-guide layer that propagates light produced by a scintillator or a fluorescent light-guide layer.

Figure 8:
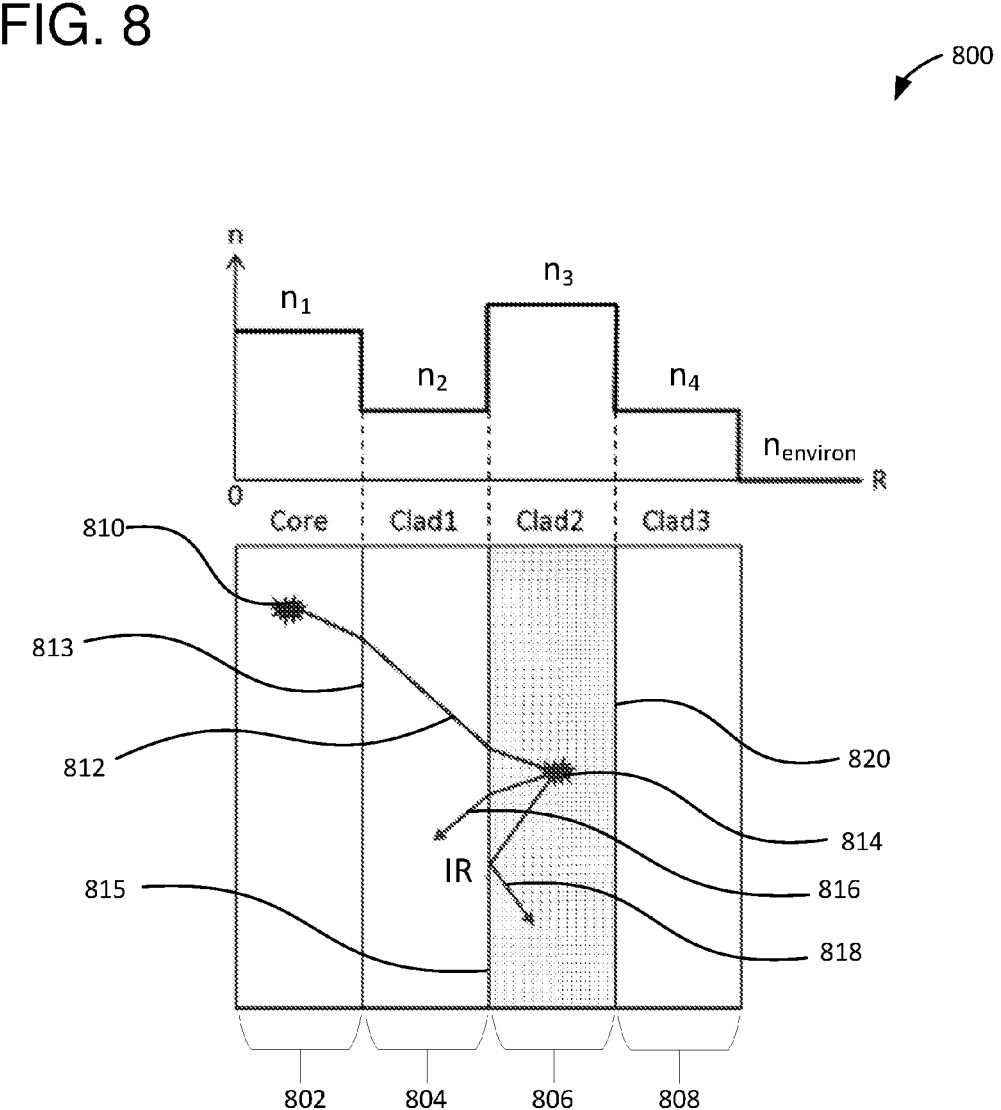
FIG. 8 is a diagram illustrating (a) the relative indices of refraction of example layers arranged as illustrated in FIG. 7 and (b) the transmission of light in the example layers produced as a result of detected radiation.

FIG. 8 is a diagram illustrating the relative indices of refraction of example layers in a radiation detector 800 having the arrangement illustrated in FIG. 7 as well as the transmission of light in the example layers produced as a result of incident radiation. Diagram 800 illustrates four layers, a scintillator layer 802 (shown as "Core"), an inner cladding layer 804 (shown as "Clad1"), a light-guide layer 806 (shown as "Clad2"), and an outer cladding layer 808 (shown as "Clad3") represented along an axis corresponding to the radius of a radiation detecting cable, where "0" indicates the center of the cable (with scintillator layer 802 being in the core of the cable and outer cladding layer 808 being the outside layer).

Radiation is incident at location 810 within scintillator layer 802, producing light. Light propagates in various directions as a result of the scintillation, including along propagation path 812 from scintillator layer 802 into inner cladding layer 804 and on to location 814 in light-guide layer 806. Light refracts at the boundary 813 between scintillator layer 802 and inner cladding layer 804 and at boundary 815 between inner cladding layer 804 and light-guide layer 806. In FIG. 8, light-guide layer 806 is shown as a fluorescent light-guide layer that absorbs light emitted by scintillator layer 802 and emits light (light of a same or different wavelength).

Some of the light emitted through fluorescence enters inner cladding layer 804 and outer cladding layer 808 (e.g., along propagation path 816). At least some light (e.g., light following propagation path 818) is internally reflected and propagates through light-guide layer 806. Some light propagates along light-guide layer 806 without reflecting. In FIG. 8, the relative indices of refraction of scintillator layer 802, inner cladding layer 804, light-guide layer 806, and outer cladding layer 808 are shown ($n_1$, $n_2$, $n_3$, $n_4$, and $n_{environ}$). The index of refraction $n_3$ of light-guide layer 806 is higher than the indices of refraction ($n_2$ and $n_4$) of the adjacent layers (inner cladding layer 804 and outer cladding layer 808), which allows total internal reflection for light rays whose angle of incidence exceeds the critical angle. The index of refraction $n_{environ}$ represents the index of refraction of whatever is beyond outer cladding layer 808, which can be, for example, air, water, argon, carbon dioxide, another cladding layer, etc.

Figure 9:
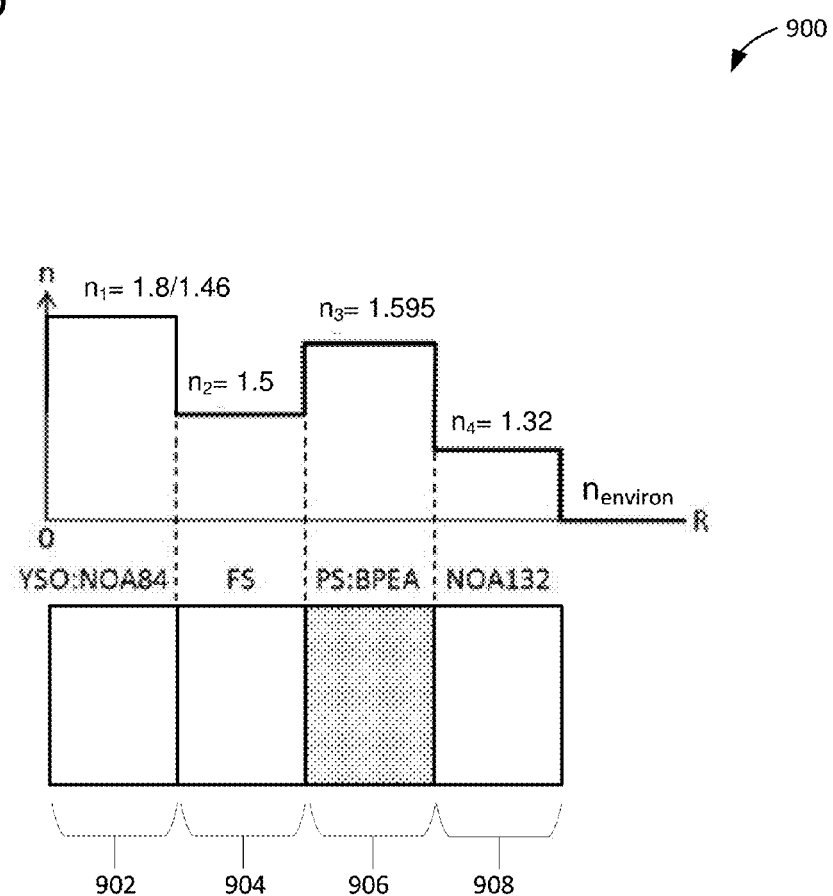
FIG. 9 is a diagram illustrating example materials and example layers arranged as illustrated in FIG. 7.

FIG. 9 illustrates a partial simplified cross-sectional view of a radiation detector 900 similar to detector 800, as well as the indices of refraction of the different layers. Detector 900 includes a scintillator layer 902, an inner cladding layer 904, a fluorescent light-guide layer 906, and an outer cladding layer 908. Scintillator layer 902 is a composite of YSO:Ce (cerium-doped yttrium orthosilicate) scintillator particles (e.g., a powder) dispersed in a transparent optical polymer such as NOA84 (Norland Optical Adhesive 84). The index of refraction of the YSO:Ce particles is approximately 1.8, and the index of refraction of the NOA84 is approximately 1.46. As used herein, a "layer" can include multiple types of materials and can include, for example, particles embedded in another material, such as the composite "YSO:NOA84" shown in FIG. 9 as well as loose particle layers.

Inner cladding layer 904 is made of fused silica (shown as "FS" in FIG. 9, n=1.5). Other materials with similar optical characteristics can also be used. In one example, a fused silica capillary is filled with the composite YSO:NOA84 material. FS capillaries with inner diameters up to, for example, 750 µm and wall thicknesses of up to, for example, 130 µm can be obtained and used as inner cladding layer 904. Other geometries are also possible. The composite YSO:NOA84 material can be introduced to the fused silica capillary by applying a vacuum on one side of the capillary followed by UV-curing the length of the detector. Alternatively, the composite YSO:NOA84 material can be introduced to the fused silica capillary by applying gas pressure to a reservoir containing composite YSO:NOA84 material and being attached to a fused silica capillary that is open on the other side.

Fluorescent light-guide layer 906 is made of, for example, polystyrene (PS) doped with BPEA (bisphenylethynylanthracene) dye (shown as "PS:BPEA" in FIG. 9, n=1.595). In some examples, the fused silica capillary containing YSO:NOA84 is dip-coated with PS:BPEA. As an example, a PS:BPEA layer of 30 µm in thickness can be used to absorb the blue light emitted by a YSO:Ce scintillator (400-500 nm) and re-emit by the BPEA in the green (470-560 nm) portion of the spectrum. Polystyrene itself has low absorbance at the BPEA emission wavelengths and can thus be used in fluorescent light-guide layer 906 with low propagation loss.

Outer cladding layer 908 can be coated with an undoped polymer such as NOA132 (Norland Optical Adhesive 132, n=1.32) that has a lower index of refraction than fluorescent light-guide layer 906 to aid with internal reflection. Outer cladding layer 908 can also be applied through dip coating.

Figure 10:
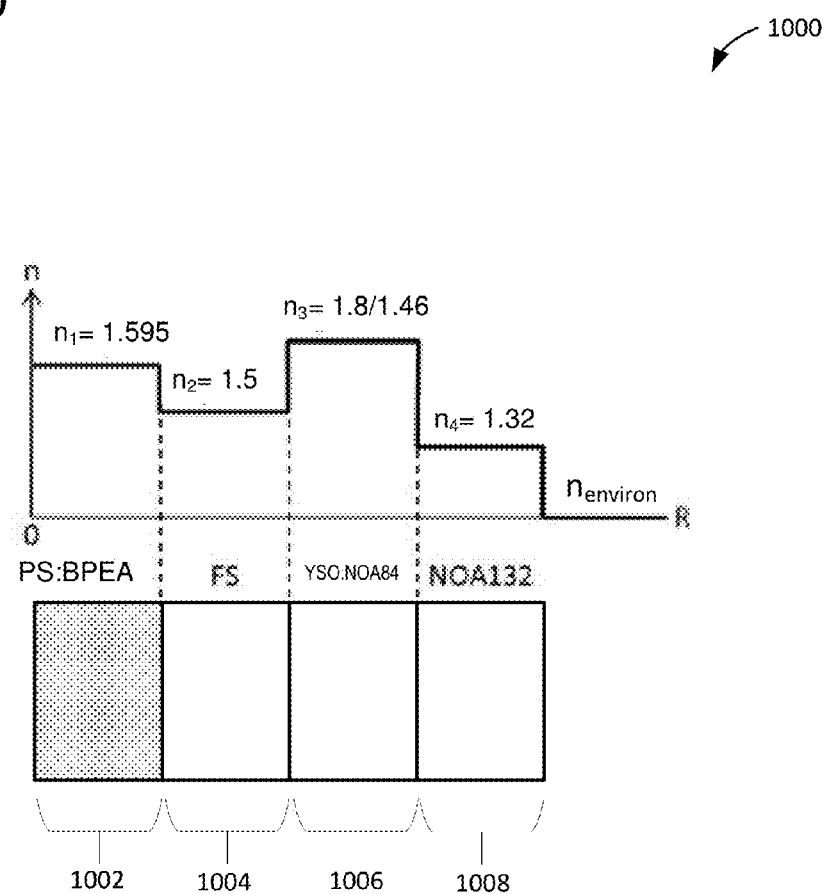
FIG. 10 is a diagram illustrating example materials and example layers in which the inner-most layer is a fluorescent light-guide layer.

FIG. 10 illustrates a partial simplified cross-sectional view of a radiation detector 1000 in which a fluorescent light-guide layer 1002 is at the core of detector 1000, as well as example indices of refraction for the different layers. A fused silica inner cladding layer 1004 is filled with the material of fluorescent light-guide layer 1002, which can be made of PS:BPEA. A scintillator layer 1006, which can be made of YSO:NOA84 (as described, for example, with respect to FIG. 9), at least partially surrounds inner cladding layer 1004. An outer cladding layer 1008, which can be made of NOA132, surrounds scintillator layer 1006. In some examples, inner cladding layer 1004 and/or outer cladding layer 1008 are omitted.

Figure 11:
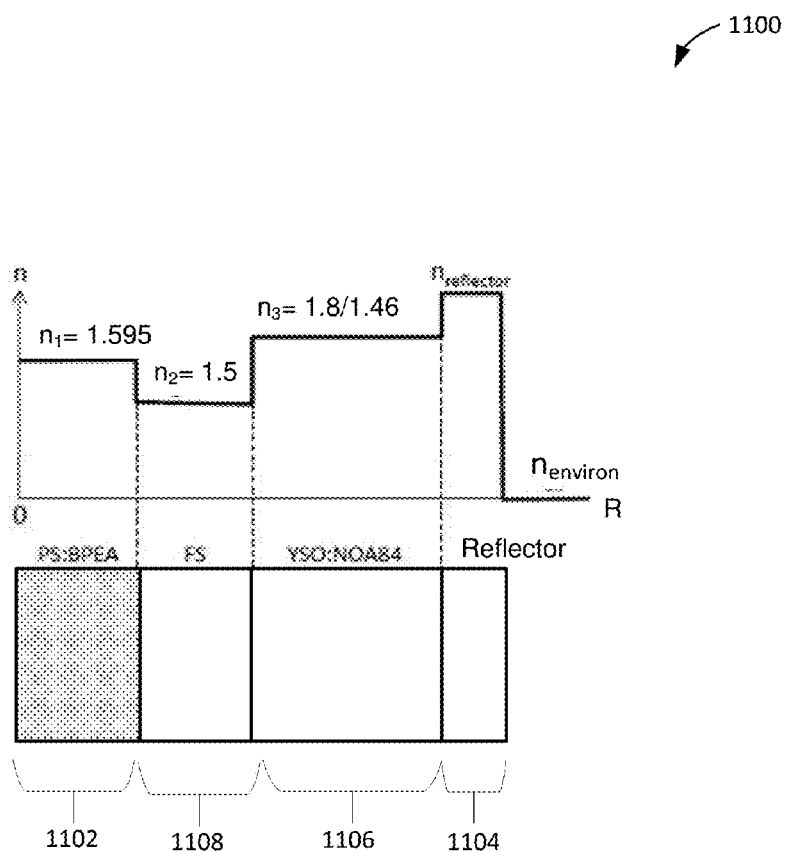
FIG. 11 is a diagram illustrating example materials and example layers similar to those shown in FIG. 10 but with a reflector layer as outer cladding layer.

FIG. 11 illustrates a partial simplified cross-sectional view of a radiation detector 1100 similar to detector 1000 in FIG. 10 in which a fluorescent light-guide layer 1102 is at the core of detector 1100, as well as example indices of refraction for the different layers. In contrast to detector 1000, however, detector 1100 includes a reflector layer 1104 as the outer cladding layer. For gamma/neutron detection examples, a scintillator layer 1106 can be made relatively thick in order to improve the interaction with the incident radiation. The outer surface of scintillator layer 1106 (that is in contact with reflector 1104) can be rough as it is not used for light propagation. Reflector layer 1104 redirects scintillation light that propagates from scintillator layer 1106 away from light-guide layer 1102 back towards light-guide layer 1102 for absorption, resulting in additional fluorescence in light-guide layer 1102. Reflector layer 1104 can be made of metal, metal foil, or other reflective material, including suitable dielectric coatings. Detector 1100 also includes a fused silica inner cladding layer 1108 that can be, for example, a fused silica capillary.

Although specific example materials are illustrated in FIGS. 9-11 (e.g., PS:BPEA, YSO:NOA84, FS, etc.), various other materials can also be used.

Some examples are discussed with the index of refraction of the light-guide layer being higher than the index of refraction of the inner (scintillator) layer and outer layer, but embodiments are also contemplated in which any of the various layers can have indices of refraction higher or lower than any of the other layers.

In some examples, the light-guide layer can be the inner layer, and the scintillator layer can partially surround the light-guide layer (effectively acting as cladding layer for the light-guide layer).

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

We claim:

1. A radiation detector, comprising:
   a scintillator layer; and
   a fluorescent light-guide layer optically coupled to the scintillator layer, the fluorescent light-guide layer configured to emit light by fluorescence in response to light emitted by the scintillator layer and propagate at least some of the light emitted by fluorescence within the fluorescent light-guide layer, wherein the light-guide layer is different from the scintillator layer.

2. The radiation detector of claim 1, further comprising an outer layer at least partially surrounding the fluorescent light-guide layer and the scintillator layer, wherein an index of refraction of the outer layer is lower than an index of refraction of the fluorescent light-guide layer.

3. The radiation detector of claim 1, wherein the scintillator layer at least partially surrounds the fluorescent light-guide layer.

4. The radiation detector of claim 1, wherein the fluorescent light-guide layer at least partially surrounds the scintillator layer.

5. A radiation detector, comprising:
   an inner layer comprising a scintillator, wherein the inner layer is configured to produce light upon receiving incident radiation; and
   a light-guide layer at least partially surrounding the inner layer, wherein the light-guide layer is configured to receive light produced by the inner layer and propagate the received light, wherein the radiation detector is configured to transmit light produced by the scintillator at a first point on the radiation detector, through the light-guide layer, to a second point on the radiation detector that is greater than ten meters from the first point.

6. The radiation detector of claim 5, wherein the scintillator is configured to produce light upon receiving at least one of alpha particles, beta particles, gamma rays, neutrons, ions, or x-rays.

7. The radiation detector of claim 5, wherein the inner layer and the light-guide layer are coaxial and elongate.

8. The radiation detector of claim 5, wherein the light-guide layer is configured to propagate the received light through internal reflection.

9. The radiation detector of claim 5, wherein the light-guide layer has a higher index of refraction than the inner layer.

10. The radiation detector of claim 5, wherein the light-guide layer comprises at least one of optical plastic, glass, or fused silica.

11. The radiation detector of claim 5, wherein the scintillator comprises at least one of a crystalline solid, an amorphous solid, or a liquid.

12. The radiation detector of claim 5, wherein a cross section of the inner layer and the light-guide layer is circular.

13. The radiation detector of claim 5, further comprising an outer layer at least partially surrounding the light-guide layer, wherein the outer layer has a lower index of refraction than the light-guide layer.

14. The radiation detector of claim 5, wherein the inner layer and the light-guide layer are flexible, and wherein a width or a height of a cross section of the light-guide layer is less than one one-hundredth of a length of the light-guide layer.

15. A radiation detection system, comprising:
a photodetector; and
a radiation-detector cable coupled to the photodetector, the cable comprising:
a scintillator layer; and
a fluorescent light-guide layer configured to receive light produced by the scintillator layer in response to incident radiation, emit light, and propagate the emitted light along the radiation-detector cable to the photodetector.

16. The radiation detection system of claim 15, wherein the fluorescent light-guide layer at least partially surrounds the scintillator layer, and wherein the radiation-detector cable further comprises an outer cladding layer at least partially surrounding the fluorescent light-guide layer, the outer cladding layer having an index of refraction that is lower than an index of refraction of the fluorescent light-guide layer.

17. The radiation detection system of claim 16, wherein the radiation-detector cable further comprises an inner cladding layer between the scintillator layer and the fluorescent light-guide layer, the inner cladding layer having an index of refraction that is lower than the index of refraction of the fluorescent light-guide layer.

18. The radiation detection system of claim 15, wherein the scintillator layer at least partially surrounds the fluorescent light-guide layer, and wherein the radiation-detector cable further comprises an inner cladding layer between the fluorescent light-guide layer and the scintillator layer, the inner cladding layer having an index of refraction that is lower than an index of refraction of the fluorescent light-guide layer.

19. The radiation detection system of claim 18, wherein the radiation-detector cable further comprises at least one of (i) an outer cladding layer at least partially surrounding the scintillator layer, the outer cladding layer having an index of refraction that is lower than an index of refraction of the scintillator layer, or (ii) an outer reflector layer at least partially surrounding the scintillator layer, the outer reflector layer having an index of refraction that is higher than the index of refraction of the scintillator layer.

20. The radiation detection system of claim 15, wherein the radiation-detector cable is more than fifty feet in length.

* * * * *